United States Patent [19]
Klaass et al.

[11] Patent Number: 5,160,069
[45] Date of Patent: Nov. 3, 1992

[54] INTEGRATED POWER UNIT COMBUSTION APPARATUS AND METHOD

[75] Inventors: Reinhard M. Klaass, Phoenix; Bert J. Minshall, Scottsdale; Francis J. Suriano, Scottsdale; William Caan, Scottsdale, all of Ariz.

[73] Assignee: Allied-Signal Inc., Morris Township, Morris County, N.J.

[21] Appl. No.: 750,176

[22] Filed: Aug. 26, 1991

Related U.S. Application Data

[62] Division of Ser. No. 411,334, Sep. 21, 1989.

[51] Int. Cl.⁵ .................................................. F02C 7/26
[52] U.S. Cl. ................................. 60/39.06; 60/39.142
[58] Field of Search .............. 60/39.06, 39.23, 39.29, 60/29.142, 39.36, 760

[56] References Cited

U.S. PATENT DOCUMENTS

| | | |
|---|---|---|
| 2,655,788 | 10/1953 | Sedille . |
| 3,271,169 | 10/1966 | Bayard . |
| 3,290,963 | 12/1966 | Oldfield et al. . |
| 3,439,495 | 4/1969 | Binley et al. . |
| 3,662,544 | 5/1972 | Kahn et al. . |
| 3,662,975 | 5/1972 | Driskill . |
| 3,704,586 | 12/1972 | Bruns ............................. 60/39.142 |
| 3,965,673 | 6/1976 | Friedrich . |
| 4,092,824 | 6/1978 | Friedrich . |
| 4,237,692 | 12/1980 | Ahrens et al. ........................ 60/727 |
| 4,312,179 | 1/1982 | Zaugg .............................. 60/39.142 |
| 4,441,028 | 4/1984 | Lundberg . |
| 4,628,687 | 12/1986 | Strom . |
| 4,630,436 | 12/1986 | Frutschi ............................... 60/727 |
| 4,631,913 | 12/1986 | Kreitmeier . |
| 4,759,178 | 7/1988 | Joy . |
| 4,766,721 | 8/1988 | Iizuka et al. . |
| 4,777,793 | 10/1988 | Weigand et al. . |
| 4,815,277 | 3/1989 | Vershure, Jr. et al. . |

FOREIGN PATENT DOCUMENTS

| | | |
|---|---|---|
| 0161561 | 11/1985 | European Pat. Off. . |
| 0344454 | 12/1989 | European Pat. Off. . |
| 17874 | 11/1955 | Fed. Rep. of Germany . |
| 2642347 | 4/1977 | Fed. Rep. of Germany ... 60/39.142 |
| 3829908 | 3/1989 | Fed. Rep. of Germany . |
| 1721110 | 11/1982 | Japan . |
| 222922 | 12/1983 | Japan . |
| 0367662 | 4/1963 | Switzerland ......................... 60/758 |
| 798704 | 12/1954 | United Kingdom . |
| 1136584 | 1/1967 | United Kingdom . |

Primary Examiner—Richard A. Bertsch
Assistant Examiner—Michael I. Kocharov
Attorney, Agent, or Firm—Terry L. Miller; Jerry J. Holden; Robert A. Walsh

[57] ABSTRACT

The invention relates to secondary power system apparatus and method for use aboard aircraft in place of conventional auxiliary power units (APU's) and emergency power units (EPU's). The invention integrated power unit (IPU) performs the function of both an APU and an EPU, while avoiding the use of hazardous monofuels. The IPU includes a turbine engine operable on pressurized ambient air, or on pressurized stored air, along with jet engine fuel. The structure of a combustion chamber for the engine which is able to use pressurized air from two separate sources; of a control able to selectively operate the engine as an EPU, as an APU, and to effect operating transition from EPU to APU; and of a complete secondary power system with the IPU are all disclosed.

3 Claims, 7 Drawing Sheets

INTEGRATED POWER UNIT COMBUSTION APPARATUS AND METHOD

This is a division of application Ser. No. 07/411,334 filed 09/21/89, pending.

This application is one of three related applications filed on the same day, all having the same coinventors, and all assigned to the same assignee. The titles of the three applications are:
 Integrated Power Unit;
 Integrated Power Unit Combustion Apparatus and Method; and
 Integrated Power Unit Control Apparatus and Method The present invention is in the field of secondary power systems for aircraft. More particularly, the present invention relates to a secondary power system for use aboard an aircraft, and which includes an integrated power unit with a turbine engine able to use fuel from the aircraft propulsion engine fuel tanks along with pressurized air provided either by a dynamic compressor of the turbine engine or by a storage bottle aboard the aircraft. The turbine engine of the integrated power unit particularly includes a single turbine section and a single combustor section. The combustor section receives fuel from the aircraft fuel tanks, and in one mode of operation receives pressurized air only from a dynamic compressor driven by the turbine section. In another mode of operation the combustor section receives pressurized air from a pressurized air storage bottle aboard the aircraft. The turbine engine is able to start and sustain operation using pressurized air from either one of the two pressurized air sources, and is able to transition from use of stored pressurized air to use of pressurized ambient air provided by the dynamic compressor.

While the propulsion engines of an aircraft ordinarily power accessory systems as well, such may not always be possible. Therefore, secondary power systems aboard the aircraft are used to power these accessory systems. Secondary power systems conventionally include an air breathing turbine engine auxiliary power unit (APU). This APU may be operated while the aircraft is on the ground or in flight to provide electrical power, hydraulic power, and pressurized air to the aircraft. Power from the APU is generally used to operate the electrical devices aboard the aircraft, to hydraulically move aircraft flight control surfaces, and to effect aircraft passenger cabin pressurization and environmental control. The secondary power system may also include an emergency power unit (EPU), which is a quick reaction power source employed in flight to provide an essential minimum of electrical and hydraulic power for aircraft operation and flight control in the event of loss of power from the main propulsion engines of the aircraft.

For a modern aircraft, the loss of accessory power resulting from a failure of the accessory devices themselves, of from the gearbox transmitting shaft power to these devices, may be more dangerous than a loss of propulsion power. Because many aircraft are not capable of sustaining controlled flight without electrical and hydraulic power, the quick-reacting EPU is employed to provide this essential power until the aircraft can descend to an altitude low enough to allow starting of the APU. The EPU is able to start and provide essential power at a higher altitude and in a shorter time than can an APU. This type of in-flight power failure is especially dangerous with dynamically unstable aircraft. The loss of flight control power results in the aircraft going out of control. If flight control power is not quickly restored, the aircraft may be lost. Thus, dynamically unstable aircraft must carry an EPU as part of their secondary power system.

The combination of APU and EPU is conventionally required to provide for all anticipated secondary power needs aboard modern aircraft. Conventional modern APU's employ an air breathing turbine engine which uses jet engine fuel from the main tanks of the aircraft. Conventional modern EPU's employ either jet fuel and pressurized air from a storage bottle aboard the aircraft, or a catalytically decomposed monofuel such as hydrazene. The disadvantages of hydrazene monofuel are well known in the art. These involve toxicity, difficulty in handling, and rapid degradation of the apparatus of the EPU itself during operation. In view of the above, an emergency power unit employing jet engine fuel and pressurized air from a storage bottle is taught by U.S. Pat. No. 4,777,793 of Francis K. Weigand, et al, which is assigned to the assignee of the present application. This EPU avoids the use of troublesome monofuels, such as hydrazene.

An integrated power unit which combines the function of an EPU and APU into a multifunction integrated power unit, and also allows a reduction of both cost and weight by elimination of redundant components. This teaching employs two separate combustion chambers, one receiving jet fuel and pressurized air from a storage container, the other receiving jet fuel and pressurized air from a dynamic compressor, and each combustion chamber driving a separate turbine and output shaft. The power delivery from the separate turbines and output shafts is delivered to an integrating gearbox which selects the power output from one of the turbines for driving of the accessory devices thereby. The multifunction integrated power unit taught by the patent to Stewart, Jr., is a considerable advance over the separate auxiliary power units and emergency power units known heretofore. This teaching which must be carried upon the aircraft, thereby reducing the complexity, cost, and weight of the systems aboard the aircraft, and of the aircraft as well.

An alternative conventional integrated power unit is taught by U.S. Pat. No. 4,815,277 to Vershur, Jr. et al, wherein a turbine engine includes a single turbine section and two separate combustion chambers. One of the combustion chambers is arranged to receive jet engine fuel and pressurized air from a storage source to provide pressurized high temperature combustion gases through an associated nozzle member to the single turbine section. The other combustion chamber is arranged to receive pressurized air from a dynamic compressor driven by the turbine section and to provide pressurized high temperature combustion products to the same single turbine section via a separate associated nozzle assembly. It appears however that the nozzle assemblies of the two separate combustion chambers must be necessarily associated closely with one another in order to deliver their respective combustion products to the same single turbine section of the integrated power unit. This association of the nozzle assemblies would appear to result in a performance limitation upon the integrated power unit, and is believed also to result in an efficiency loss in the APU (normal air breathing) mode of operation of the integrated power unit.

A further shortcoming of the arrangement of integrated power unit taught by the patent to Vershur, Jr., et al, is its inability to operate simultaneously with both combustion chambers. This kind of simultaneous or hybrid operation with both combustion chambers providing high temperature pressurized combustion products to the turbine section might possibly allow economies with respect to the use of pressurized air from the storage source. Unfortunately the combustion chamber using pressurized air from the storage source carries out its combustion in a fuel rich manner, while the combustion chamber using pressurized air from the dynamic compressor carries out combustion in an air rich environment. Were the two combustion chambers to be operated simultaneously, the fuel rich and the air rich combustion products would mix immediately at the entrance to the single turbine section. The result of this mixing of air rich and fuel rich combustion products would be combustion within the turbine section. Such combustion within the turbine section of a turbine engine is inherently inefficient with respect to fuel utilization, and also would expose the turbine section to unacceptably high temperatures.

Further to the above, an integrated power unit in accord with the teaching of the patent to Vershur, Jr., et al., may be larger and heavier than desired. Such is the case because this conventional integrated power unit necessarily includes two combustors, two turbine nozzles, duplicate igniters, and power supplies for the igniters, as well as two separate fuel metering devices.

In view of the deficiencies of known auxiliary power units, emergency power units, and integrated power units as outlined above, an object for the present invention is to provide a secondary power system including an integrated power unit which includes a turbine engine with a single turbine section, a dynamic compressor, and a combustion chamber able to receive jet engine fuel and pressurized air either from the dynamic compressor or from a storage source of pressurized air.

An additional object of this invention is to provide a secondary power system with an integrated power unit as described above and wherein the integrated power unit is able to start and sustain operation using pressurized air from the storage source (much like an emergency power unit, EPU), to start and sustain operation using pressurized ambient air from the dynamic compressor (much like an auxiliary power unit, APU), and additionally to transition from EPU to APU modes of operation.

Yet another additional objective of the present invention is to provide a secondary power system with an integrated power unit as outlined in the preceding paragraphs and wherein the transition between EPU operation and EPU operation of the integrated power unit is accomplished without an interruption of combustion in the combustion chamber, and without a loss of horsepower output from the integrated power unit.

Additional objects and advantages of the integrated power unit and secondary power system according to the present invention will be appreciated in view of a reading of the following detailed description of a single embodiment of the invention taken in conjunction with the following drawing figures.

BRIEF DESCRIPTION OF THE DRAWINGS

FIG. 1 provides a schematic presentation of a secondary power system (SPS) 10 embodying the present invention. In order to gain a generalized overview of the operation of the secondary power system 10, it is necessary to understand that the unit is able to start and sustain operation generally as an emergency power unit utilizing fuel from a tank 14 and pressurized air from a storage bottle 16. The secondary power system is also able to start and sustain operation generally like an auxiliary power unit employing pressurized ambient air provided by a dynamic compressor 22 and fuel from the tank 14. In both modes of operation, combustion takes place within a single combustion section 26.

Figure 1:
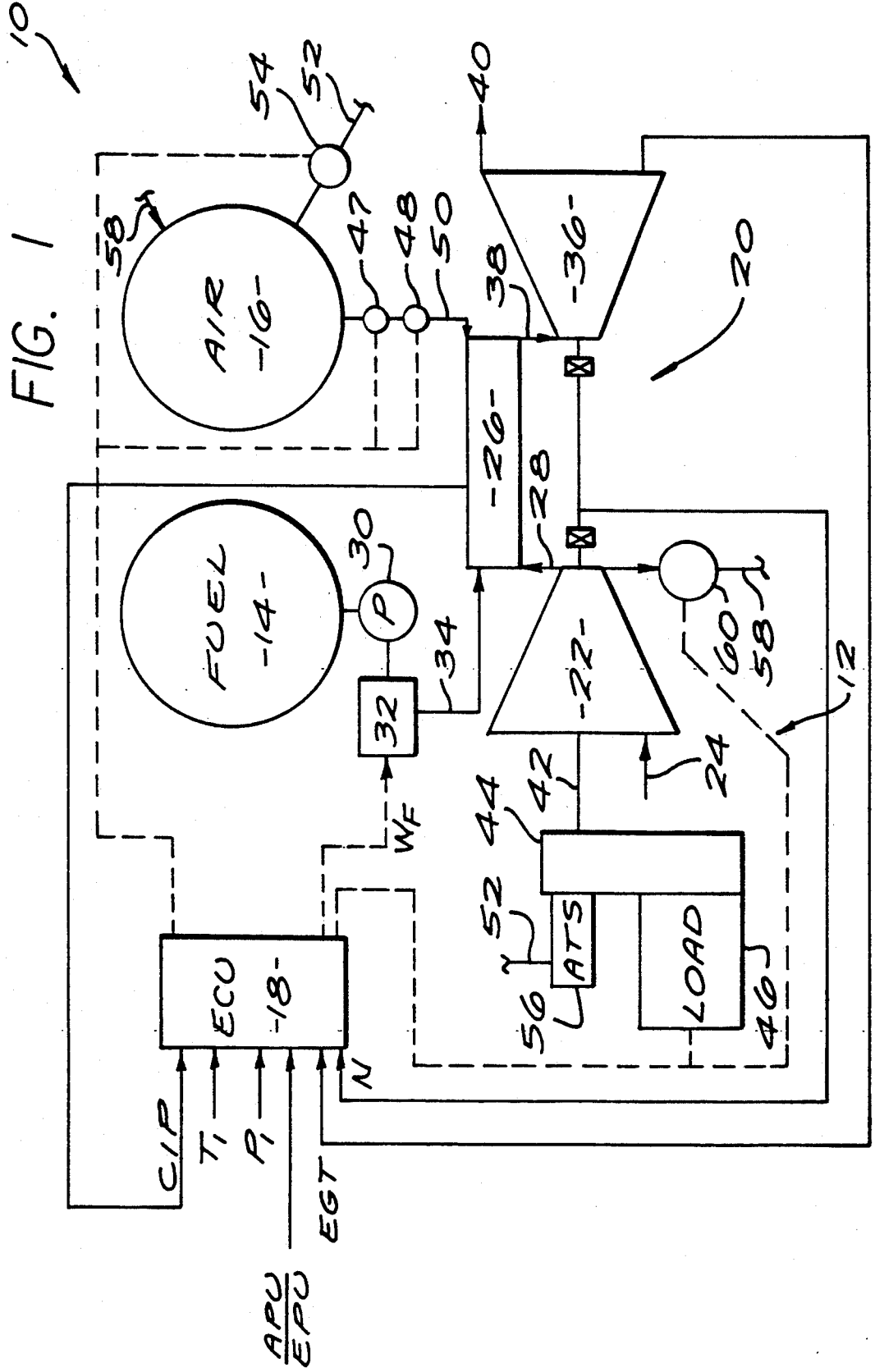
FIG. 1 presents a system schematic of a secondary power system including an integrated power unit according to the present invention.

The SPS 10 in overview includes an integrated power unit (generally referenced with the numeral 12), a source of fuel 14 (which may be the jet engine fuel tanks of an aircraft carrying the SPS 10), a storage source of pressurized air (such as a pressurized air storage bottle referenced with the numeral 16), and an electronic control unit (ECU) generally referenced with the numeral 18. The ECU 18 controls the operations of the secondary power system. Viewing the secondary power system in greater detail, it will be seen that the integrated power unit 12 includes as a prime mover a turbine engine which is referenced with the numeral 20.

The engine 20 includes a dynamic compressor 20 section 22 which in APU operation ingests ambient air, as indicated by arrow 24, and delivers this air pressurized to a combustor section 26, as is indicated by arrow 28. The combustor section receives fuel from the source 14 via a pump 30, a fuel control apparatus 32, and a conduit 34. Combustion maintained within the combustor section 26 provides a flow of high temperature pressurized combustion products. These combustion products flow to a turbine section 36 (as is indicated by arrow 38) wherein they are expanded toward ambient pressure and discharged (as is indicated by arrow 40) to produce shaft power. The turbine section 36 drives a shaft 42 which in turn drives the dynamic compressor section 22. The shaft 42 extends to a power distribution gearbox, which is schematically referenced with the numeral 44. The gearbox 44 may carry a variety of shaft power consuming accessory devices, which in total are schematically depicted and referenced with the numeral 46.

An alternative EPU mode of operation for the secondary power system 10 is provided by the air storage bottle 16. This storage source of pressurized air may provide pressurized air to the combustor section 26 via a regulating and shutoff valve 47, an air flow modulating valve 48 connected in series with the valve 47, and a conduit 50. Pressurized air received from the air storage bottle 16 via the valves 47, 48 and conduit 50 enables combustion to be carried out within combustor 26 employing fuel from tank 14 received via conduit 34 in much the same way that combustion was carried out using pressurized ambient air provided by dynamic compressor 22. This EPU mode of operation for the SPS 10 is discussed in greater detail below.

In order to start the secondary power system 10 in auxiliary power unit (or normal air breathing) mode the secondary power system includes a conduit 52 and a valve 54 controlling air flow in this conduit. The conduit 52 provides air flow from the storage bottle 16 to an air turbine starter (generally referenced with the numeral 56) and associated with the power distribution gearbox 44.

During the operation of the secondary power system 10 in auxiliary power unit (APU) mode, the air storage bottle 16 may be recharged employing air bled from the dynamic compressor 22 via a conduit 58. The bleed air from compressor 22 is conveyed by the conduit 58 to an air pressure amplifying device, generally referenced with the numeral 60, and thence to the air storage bottle 16. Additionally, subsequent to either one of starting and operation of the secondary power system in EPU mode and a transition to APU mode, or starting of the secondary power system in APU mode, such that pressurized air is consumed from the air storage bottle 16, the pressure amplifier 60 is employed to increase the pressure of air bled from the dynamic compressor 22 via the conduit 58 in order to recharge the pressure storage bottle 16. All of the foregoing occur under control of the electronic control unit (ECU) 18.

To summarize, the secondary power system 10 may be started and operated in auxiliary power unit (APU) mode while the aircraft is on the ground or in flight at a comparatively low altitude to provide hydraulic, electrical, and pressurized air services to the aircraft. On the other hand, should the aircraft be in flight at an altitude above that allowing starting and operation of the secondary power system in airbreathing mode, or should a failure of the electrical, hydraulic or pressurized air systems of the main propulsion engines occur at any altitude, the secondary power system 10 may be started and operated as an emergency power unit (EPU) using pressurized air from the storage bottle 16 as generally outlined above. This emergency power unit mode of operation may be sustained for a period sufficiently long to allow descent of the aircraft to a lower altitude whereat operation of the secondary power system may be transitioned to auxiliary power unit mode. That is, the SPS may switch over to normal air breathing operation when aircraft altitude is low enough to allow the compressor section 22 to meet the air flow and pressure requirements of the combustor section 26.

Alternatively, the transition from EPU to APU mode of operation may be effected at a higher altitude provided that the compressor 22 is able to supply sufficient air flow and pressure to meet the existing power needs of the aircraft. That is, the transition to APU mode of operation may result in a power output from the IPU 12 which is less than its peak power output capability at the particular altitude. However, so long as the decreased power output of the IPU 12 is adequate to meet the power needs of the aircraft at the time, the transition may be effected at a comparatively high altitude with a resultant savings in the use of pressurized air from storage tank 16.

Having considered in general overview the operation of the secondary power system 10 and the integrated power unit 12 including the turbine engine 20, power distribution gearbox 44, load apparatus 46, and air turbine starter 56, attention may be directed now particularly to the turbine engine 20 which is the prime mover for the integrated power unit 12.

Figure 2:
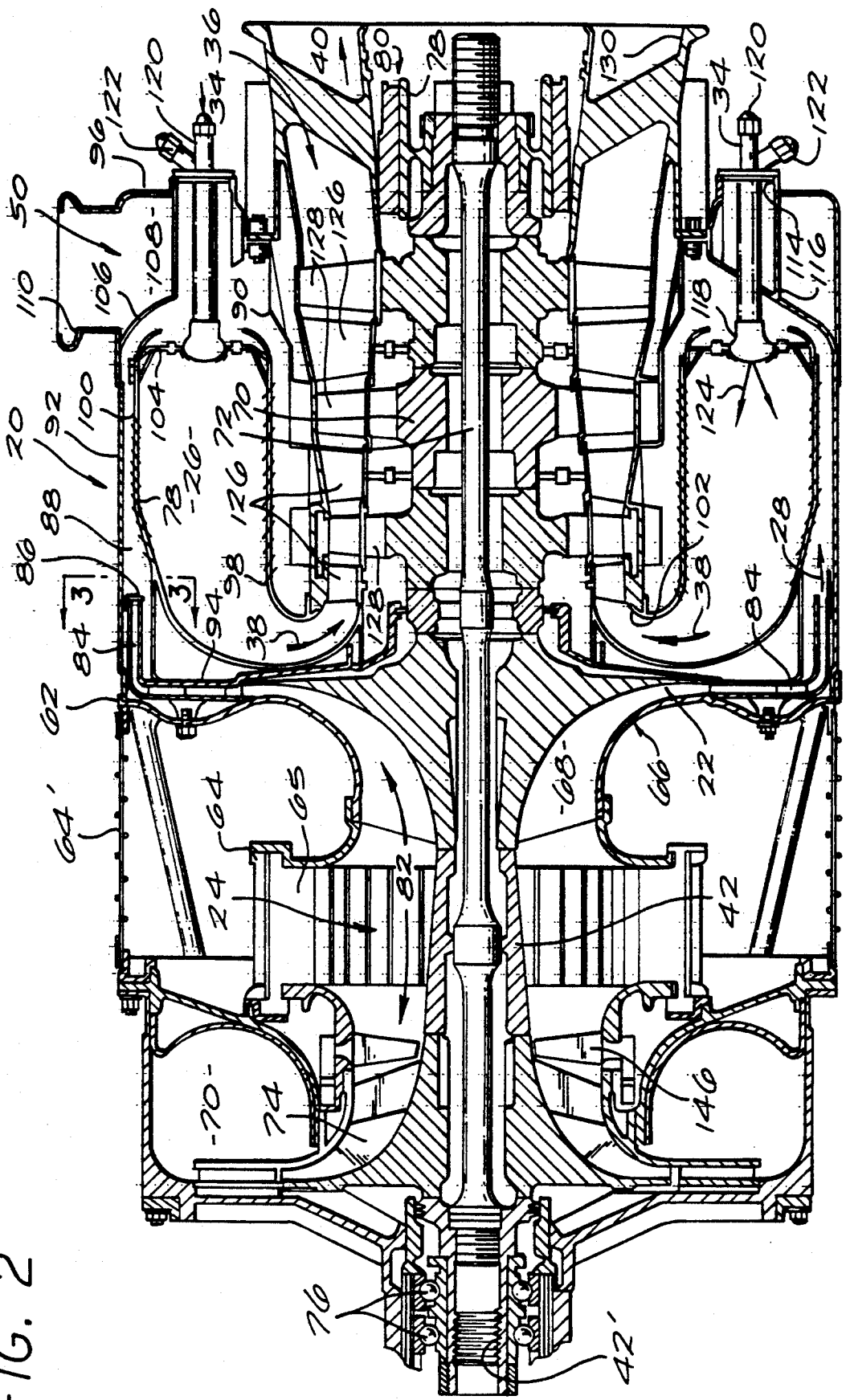
FIG. 2 provides a longitudinal cross sectional view through a turbine engine included by the integrated power unit portion of the secondary power system depicted in FIG. 1.

In viewing FIG. 2, it will be seen that the turbine engine 20 includes a housing generally referenced with the numeral 62. The housing 62 defines an inlet 64 opening to ambient via an inlet screen 64', and through which a flow of ambient air (arrow 24) is received. In the inlet 64 housing 62 carries a circumferentially arrayed plurality of pivotal inlet blocking vanes 65. The blocking vanes 65 are synchronized in their movement between an open position (as shown) and a closed position (not shown), wherein adjacent ones of the vanes cooperate to close the inlet 64 with respect to flow of air. The vanes 65, as depicted, are lightly spring loaded toward their closed position, but are easily moved to the depicted open position by a slight sub-ambient pressure in the inlet 64. This sub-ambient pressure occurs in inlet 64 during operation of the engine 20 in its APU, or normal air breathing, mode. A conventional two-position actuator (not shown) may be provided to move the blocking vanes 65 positively between their fully open and fully closed positions under control of the ECU 18, as well as latching the vanes in either of the selected positions.

The housing 62 journals a rotor member generally referenced with the numeral 66. Rotor 66 includes a compressor rotor portion 68, a turbine rotor portion 70, and an elongate tie bolt 72. Cooperatively, the portions 68, 70, tie bolt 72, and a load compressor rotor 74 substantially complete the shaft 42 of the engine 20, recalling the schematic depiction of FIG. 1. The shaft 42 is journaled in housing 62 by a pair of angular contact bearings 76 which sustain both radial and thrust loads, and by a journal 78, forming a part of the shaft 42. The journal 78 is supported radially by a self-generating gas dynamic journal bearing structure, generally referenced with the numeral 80. At its left end, viewing FIG. 2, the shaft 42 includes a splined drive coupling portion 42' whereby shaft power is transferred from engine 20 to the power distribution gearbox 44.

Cooperatively, the housing 62 and rotor member 66 define a bifurcated flow path generally referenced with the numeral 82. The flow path 82 extends in one axial direction through the compressor section 22 and in the opposite axial direction through the load compressor section 74. The load compressor 74 is driven by the shaft 42 and provides pressurized air via an outlet (not shown) to services aboard the aircraft, such as for crew cabin pressurization and an environmental control system. The flow path 82 also extends axially through the compressor section 22 and radially outwardly and axially through a circumferentially extending deswirler and diffuser assembly generally referenced with the numeral 84. At the outlet of the deswirler and diffuser assembly 84, a circumferentially arrayed plurality of check and metering valves 86 is disposed. These check and metering valves 86 will be described in greater detail herein below, but in their open position they allow discharge of pressurized air from the compressor section 22 into a combustor section plenum chamber generally referenced with the numeral 88, as is indicated by the arrow 28. The plenum chamber 88 is defined by a radially inner annular wall 90 and a radially outer annular wall 92 of the housing 62. A pair of radially and circumferentially extending end walls 94, 96 cooperate with the walls 90, 92 to bound the chamber 88.

Within the combustion plenum chamber 88, a pair of radially spaced apart perforated annular combustion liner walls 98, 100 are disposed in radially spaced relation with the walls 90, 92. The combustion liner walls 98, 100 cooperatively define a combustion flow path (arrow 38) leading axially and radially inwardly to an exit 102 from the combustion section 26. The exit 102 leads to the turbine section 36 of the engine 20. A perforated combustor dome wall 104 extends circumferentially and radially between the pair of annular walls 98, 100 to complete delineation between the plenum chamber 88 and the combustion flow path, which is represented in FIG. 2 with the arrows 38.

Also in the combustion section 26, a circumferentially extending foraminous air distribution wall 106 extends radially and obliquely between the walls 90, 92 to divide a circumferential air distribution chamber 108 from the remainder of the plenum 88. The wall 106 is adjacent but axially spaced from the dome wall 104 of combustion liner walls 98, 100. The outer annular wall 92, which is also an outer wall of the housing 62, defines an air inlet 110 communicating with the air distribution chamber 108. In FIG. 2, the arrow 50 denotes that pressurized air is received into chamber 108 via the inlet 110 from conduit 50, recalling the schematic depiction of FIG. 1. A circumferentially spaced apart plurality of air assist, air blast fuel injection nozzles 112 extend through openings 114 of the end wall 96, through the air distribution chamber 108 within shield tubes 116, and through openings 118 of the combustor dome wall 104. The fuel injection nozzles 112 receive pressurized fuel at fittings 120 which connect with the conduit 34, recalling FIG. 1. This fuel delivery to the nozzles 112 is depicted in FIG. 2 by the arrows 34. Nozzles 112 also receive pressurized air at a fitting 122. The fuel and pressurized air are discharged by nozzles 112 as a fine fuel spray delivered into the combustion flow path 38, as depicted by arrows 124, to support combustion therein. The resulting high temperature pressurized combustion products are discharged to the turbine section 36 via the combustion section exit 102. The turbine section 36 includes three rows of stationary nozzle vanes 126, each followed by a respective row of rotary turbine blades 128. The turbine blades 128 are carried by the turbine rotor 70. Relatively low energy combustion products are discharged from an outlet 130 of the engine 20, as depicted by arrow 40.

Figure 3:
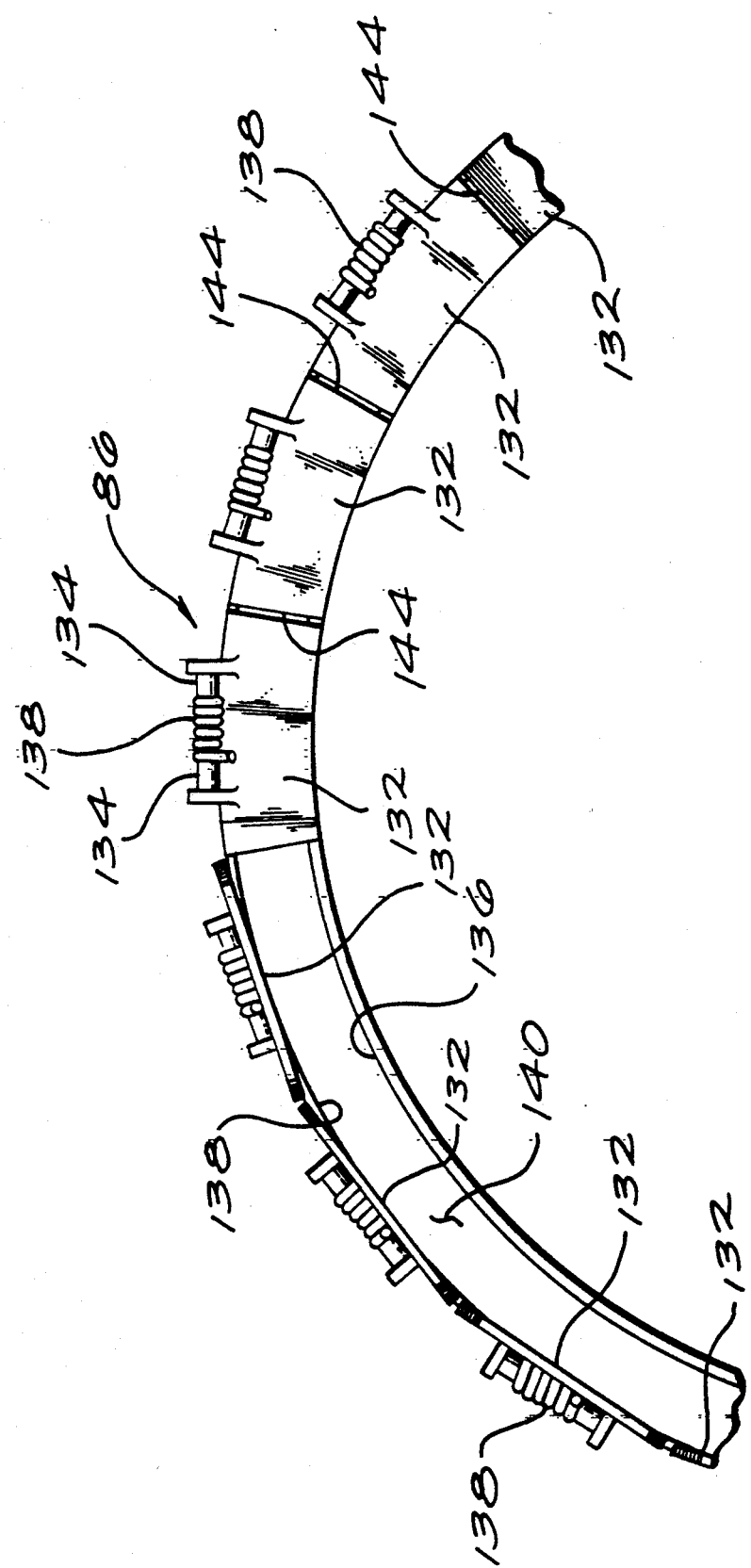
FIG. 3 provides an enlarged fragmentary and transverse cross sectional view taken along line 3—3 of FIG. 2, and viewed in the direction of the arrows.

Viewing now the fragmentary cross-sectional view of FIG. 3, it will be seen that the check and metering valves 86 in fact include a plurality of circumferentially arrayed individual flapper valve members 132. Each of the flapper valve members 132 is pivotally connected by a hinge 134 to a radially outer one of a pair of walls 136, 138. The walls 136, 138 cooperatively define an axially extending part of the deswirler and diffuser path 84, and an opening 140 therefrom into the plenum 88. In their open position, viewing the left-hand portion of FIG. 3, the flapper valve elements 132 swing aside to allow pressurized air flow from opening 140 to plenum 88. Each of the flapper valve members 132 is lightly spring loaded to pivot to a closed position, viewing the right-hand side of FIG. 3, thereby to obstruct the opening 140. Attention to the right-hand side of FIG. 3 will also reveal that circumferentially adjacent ones of the valve members 132 are spaced circumferentially apart in their closed position to define a metering gap 144. The function of metering gap 144 is more particularly described hereinbelow. However, it is to be noted that the check and metering valve assembly 86 allows full air flow toward plenum 88 from compressor section 22, and only a metered air flow in the reverse direction.

During operation of the engine 20 in EPU mode, pressurized air from the storage source 16 is provided to the distribution chamber 108 via the valves 47, 48, conduit 50, and inlet 110. This air is distributed to the combustion plenum chamber 88 via the perforated air distribution wall 106. From the plenum 88, pressurized air flows through the foraminous walls 98, 100 and dome wall 104 to sustain combustion in flow path 38, recalling FIG. 2. The pressurized high temperature combustion products are expanded through the turbine section 36 to drive shaft 42 including compressor rotor 68, and load compressor rotor 74. The shaft 42 delivers shaft power to gearbox 44 via the coupling at 42'.

Importantly, in EPU mode of operation the check and metering valve assembly 86 is closed so that only a metered amount of air flows from plenum 88 through the metering gaps 144, through the deswirl and diffuser structure 84, and in the reverse direction through the compressor rotor 68 to the inlet 64. The reverse air flow through compressor section 22 flushes out high temperature air resulting from windage or churning in the compressor section. Because the inlet blocking vanes 65 are also closed in EPU mode, this small flow of air to the inlet flows through load compressor 74. The metered amount of air flowing in the reverse direction in compressor section 22 additionally serves to provide viscous or mass damping to the blades of compressor rotor 68. The viscous mass damping of the blades on compressor rotor 68 prevents vibration and fatigue cracking of these blades.

Further to the above, the metered reverse flow of air through the compressor section 22 aerodynamically declutches the compressor rotor 68. In other words, because of the small reverse flow of air therethrough, the declutched compressor section 22 does not develop its design pressure ratio at design speed. The declutching reverse air flow through compressor section 22 is a fractional part of the normal design flow, and is generally about 6–7% of the design flow. The declutched compressor rotor preferably requires about 10% or less of its normal drive horsepower at design speed.

The Applicants believe that two effects in concert effectively declutch the compressor rotor 68 both at high and low altitudes. That is, the small reverse air flow through the compressor section serves to reduce the power absorbed by rotor 68 and to ensure that the inlet pressure is supra ambient at high altitudes. Consequently, the inlet blocking vanes 65 remain closed as the aircraft descends, regardless of whether the vanes are latched closed or merely biased closed. As the aircraft carrying the IPU 12 descends to an intermediate altitude, atmospheric pressure increases. However, because the declutched compressor does not develop its normal pressure ratio with the small reverse air flow therethrough, the pressure within the closed blocking vanes 65 remains supra ambient and ambient air is not ingested. If the transition to air breathing mode is permissible in view of the load on the IPU 12 and is made at this altitude, spring biased inlet blocking vanes are effective. These biased blocking vanes will remain closed until the declutching reverse flow is stopped, and will be opened by atmospheric pressure when the compressor section 22 reverts to normal operation.

However, if EPU operation is to be continued to a comparatively low altitude, the blocking vanes must be latched closed by a two-position actuator, as mentioned earlier. Such is the case because with decreasing altitude, atmospheric pressure becomes greater than the pressure within the closed blocking vanes 65. If ambient air were allowed to enter the inlet 64, the declutching reverse air flow may be overcome so that compressor 22 reverts to normal operation before it alone is able to provide the mass air flow required to sustain the load on the IPU 12. However, by latching the blocking vanes 65 in their closed position ingestion of ambient air is prevented, and EPU operation may be sustained to meet the power demand on the IPU 12 until aircraft altitude is low enough to allow compressor 22 alone to meet the air flow required by the load on the IPU 12.

When ambient atmospheric conditions are appropriate for operation of engine 20 in APU (normal air breathing) mode, the flow of pressurized air from storage source 16 to chamber 108 is shut off. Consequently, the reverse flow through compressor section 22 ceases, as well as the aerodynamic declutching of compressor rotor 68. Almost immediately, the air flow in compressor section 22 reverts to its normal direction, and the design air flow and pressure ratio is provided by the compressor section 22. This normalizing of compressor section air flow is accomplished without surge, and without shock loadings which might fatigue or undesirably vibrate portions of the engine structure. This normalizing of compressor section air flow opens the inlet blocking vanes 65 as a result of the subambient pressure created in inlet 64, and opens the flapper valve elements 132 of the check and metering valve assembly 86 in opposition to their light closing bias. Alternatively, the two-position actuator (not shown) may be employed at this time to move the blocking vanes 65 from their closed to their open position under control of ECU 18.

Throughout this transition of the engine 20 from EPU to APU (normal air breathing) mode, fuel delivery to the combustor is effected via the fuel nozzles 112 under control of the fuel control 32 and ECU 18. Combustion in combustor section 26 is continuous during this transition, and shaft horsepower from the engine 20 is almost perfectly constant, as is further set out below. The engine 20 always operates with air rich combustion so that no transition from fuel rich to air rich condition is experienced. In fact, analysis carried out by the Applicants has indicated that while axial air flow in the precombustion plenum does reverse between walls 92 and 100 as the transition from EPU to APU mode takes place, the transition is actually conducive to continuous combustion rather than mitigating toward combustion loss or flame out. Such is the case because, for example, Joule-Thomson cooling of air delivered from storage bottle 16 results in an air temperature at chamber 108 of about $-70°$ F. at 20,000 feet altitude and $-12°$ F. standard atmospheric conditions. On the other hand, air flow from dynamic compressor section 22, which is achieved almost immediately during the transition to APU mode of operation, enters the combustion plenum 88 at about 500° F. This marked increase in temperature of the air within which combustion is carried out assists in fuel atomization from injectors 112. A similar increase in temperature of air fed to combustor 26 will apply regardless of the altitude at which the transition is effected.

Figure 4A:
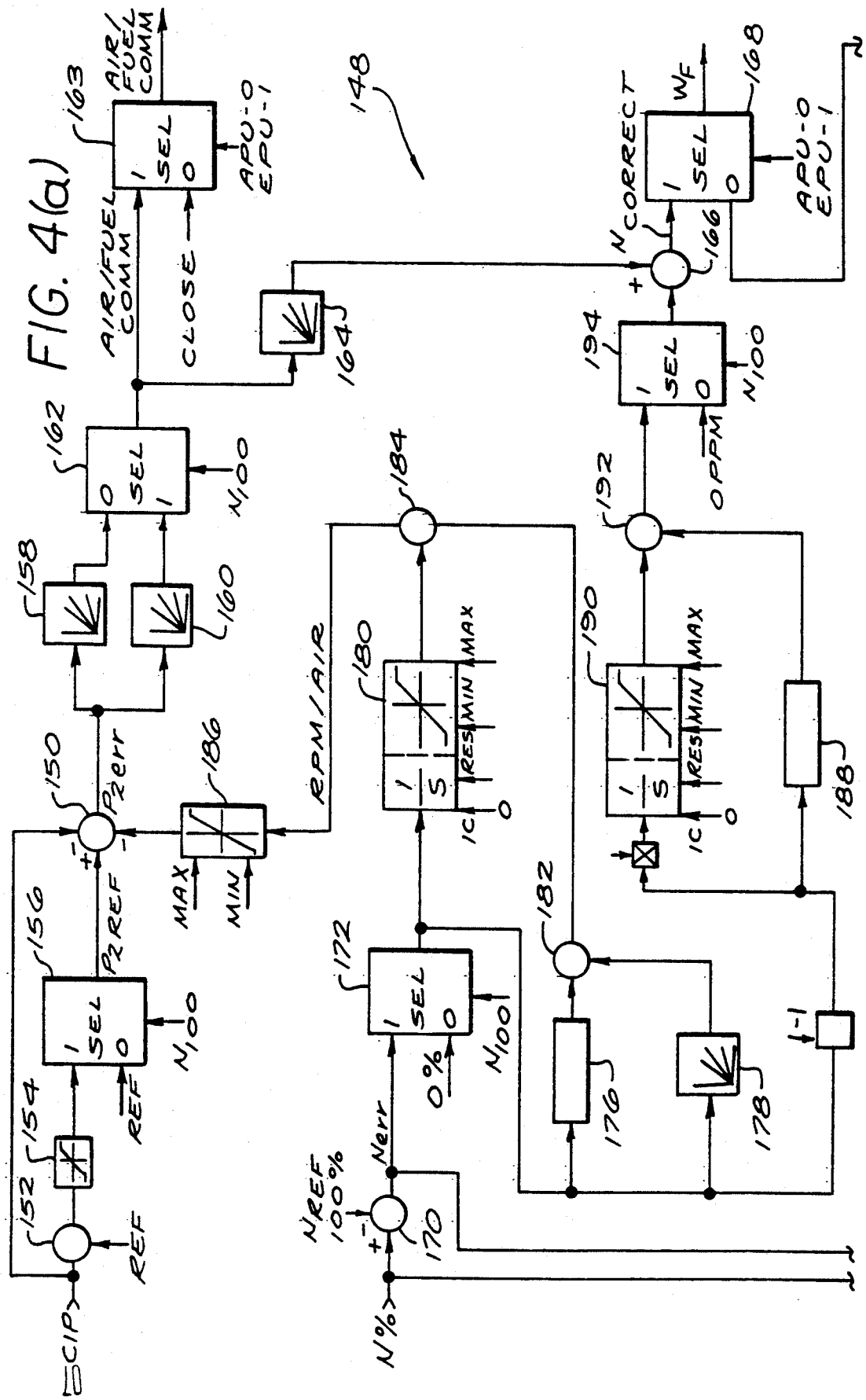
FIGS. 4a and 4b together provide a fragmentary or partial schematic presentation of a control unit overseeing and effecting the operation of the secondary power system depicted in FIG. 1.
Figure 4B:
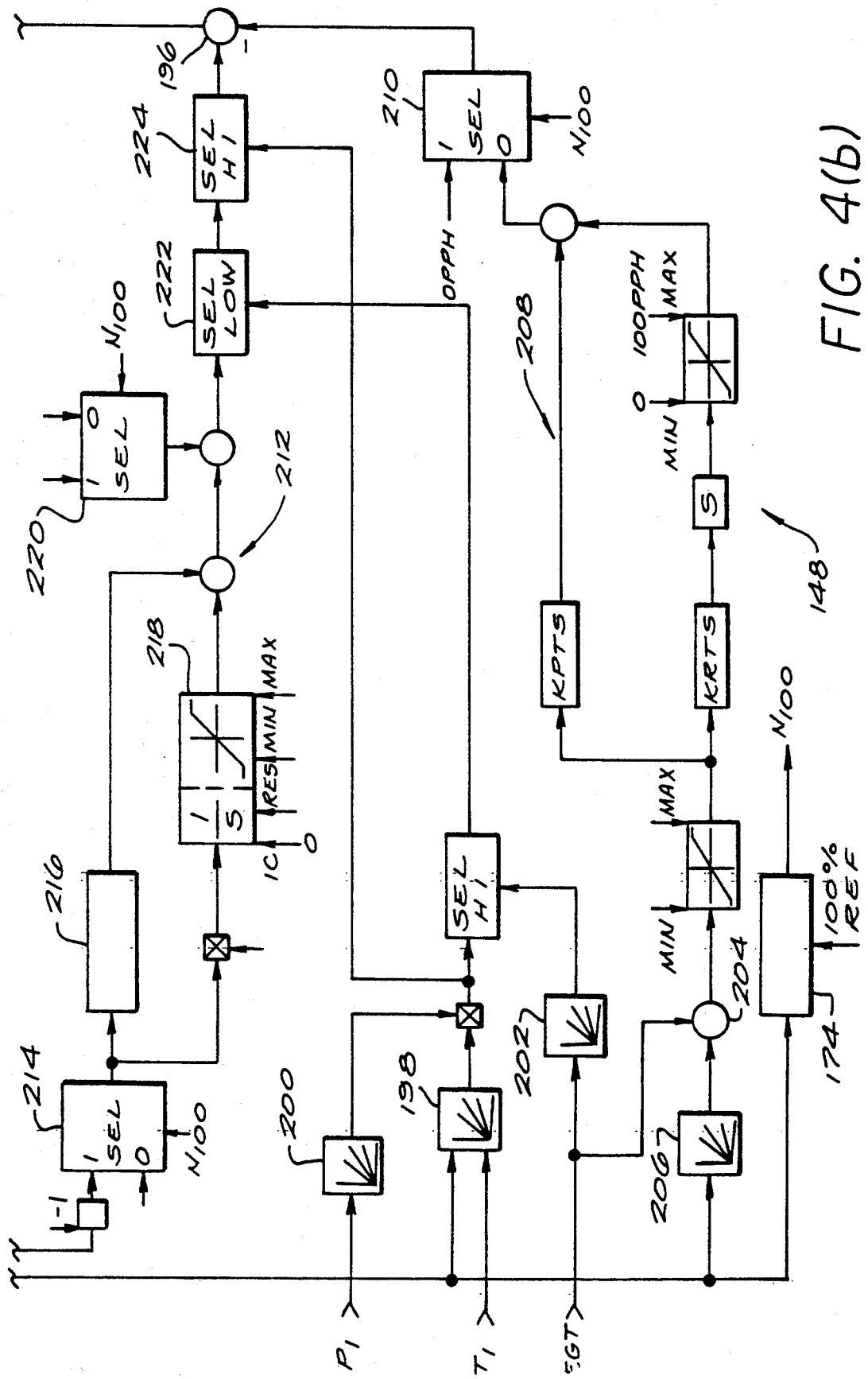

Having observed the structure and general operation of the IPU 12, attention may now be directed to the control portion 148 of the IPU, which is schematically depicted in FIG. 4. The control portion 148 is a part of the ECU 18 depicted in FIG. 1. It must be recalled that the IPU 12 is capable of operation in several modes, and that the control portion 148 depicted in FIG. 4 comprehends control of the turbomachinery previously discussed in each one of these operating modes, as well as the transition from EPU to APU operation. The control functions provided by control portion 148 include startup and sustained operation in EPU mode, startup and sustained operation in APU mode, and transition from operation in EPU mode to sustained operation in APU mode with discontinuation of EPU operations. The control portion 148 provides as its output a signal $W_F$ indicative of the weight of fuel per unit of time which is to be supplied to combustion section 26 by the fuel controller 32 under control of the ECU 18. Control operations of the control portion 148 are discussed in greater detail, as follows.

EPU START AND OPERATION

Initiation of an EPU startup requires delivery of pressurized air from the storage source 16 via control valves 46, 48 to the combustion section 26 of IPU 12, along with fuel from the aircraft tank 14. This air and fuel must be delivered to the combustion section 26 in a selected ratio and ignited to initiate EPU operation of the IPU 12. Accordingly, the control portion 148 receives as a variable to be controlled a signal CIP indicative of combustor inlet air pressure at combustor section 26. That is, the signal CIP is indicative of the air pressure within plenum 88 of the combustor 26 of IPU 12. During startup of IPU 12 in EPU mode only the signal CIP is employed to control air delivery from tank 16 to IPU 12, and by controlling this air delivery to also control fuel delivery via fuel controller 32. Simply stated, during startup in EPU mode, air flow to combustor 26 is modulated to achieve a selected pressure therein (as indicated by the signal CIP), and fuel flow is controlled or scheduled only in response to the air pressure level signal CIP to control air fuel ratio for startup acceleration of the IPU 12.

Figure 5:
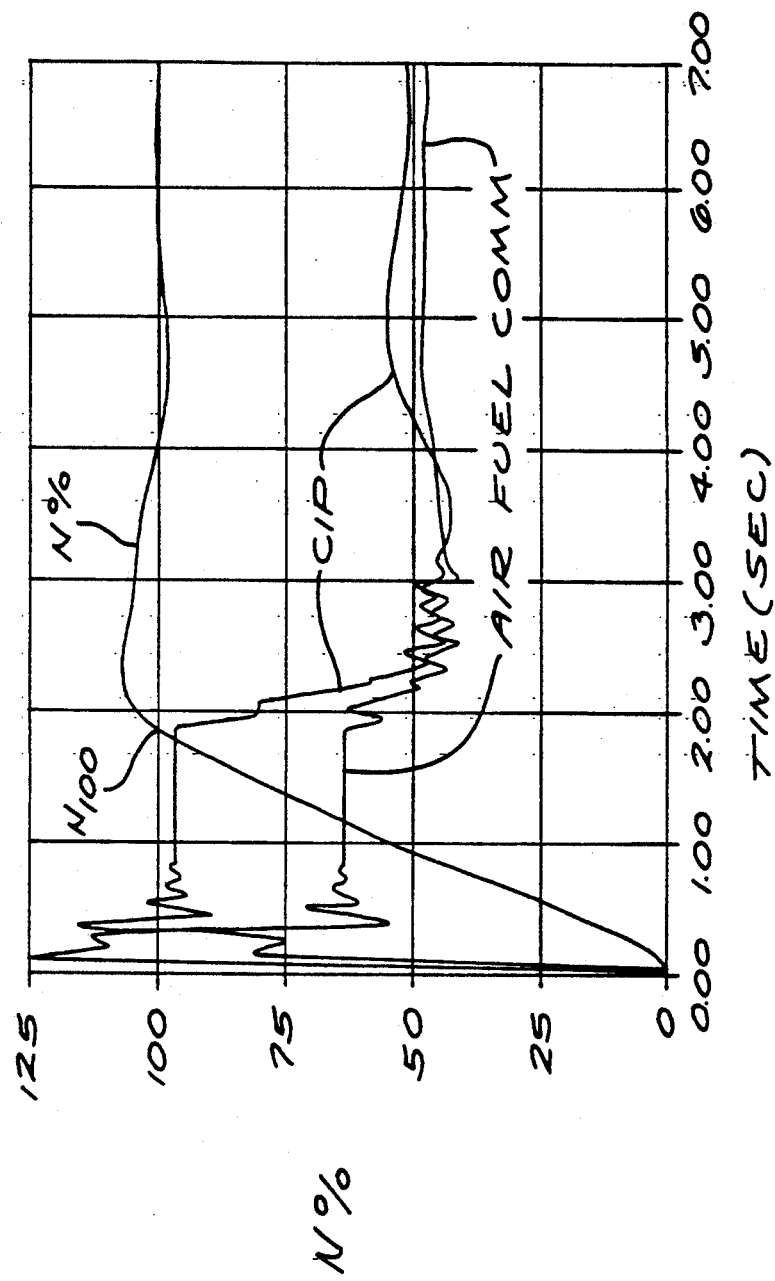
FIGS. 5 and 6 are graphical presentations of operation parameters of the integrated power unit during a startup of the turbine engine in emergency power unit mode, and during a transition from emergency power mode to auxiliary power unit mode, respectively.

As an aid to the reader, FIG. 5 graphically presents information concerning three operating parameters of engine 20 during a startup and sustaining operation in EPU mode. Notations to FIG. 5 are placed in the following text at locations where it is believed reference to this FIGURE in combination with the text will be particularly helpful to the reader. The one trace is engine speed (signal N%, speed of shaft 42) in percent of design speed. Traces also presented, respectively represent air pressure in plenum 88 (signal CIP) and the rate of air delivery to this plenum in pounds per second (signal Air/Fuel COMM).

In greater detail, the signal CIP is fed as a negative value to a summing junction 150, which also receives a positive reference signal $P_2$ref from bias junction 52, limiter 154, and selector 156. The selector 156 is one of several selectors within the control portion 148 which receive as an input a signal designated as $N_{100}$. Each of these selectors is in a zero (0) condition at the initiation of operation of IPU 12 in any mode so that they select and provide as their output the signal provided to their (0) terminal. While the providing of the $N_{100}$ signal will be discussed in greater detail later, it is sufficient at this time to understand that the $N_{100}$ signal is a step function or binary signal indicating that IPU 12 has accelerated during startup and has achieved either one-hundred percent of its design operating speed or a selected speed substantially at the design speed. The reference value at terminal (0) of selector 156 is chosen to effect rapid acceleration of the IPU 12 toward its design operating speed. The output from junction 150, designated $P_2ERR$ is applied as an independent variable to each of two schedulers 158, and 160. Because of a selector 162 downstream of the schedulers 158 and 160, only the signal from scheduler 158 is employed during startup of IPU 12 in EPU mode. The scheduler 158 is structured to provide a command signal, designated Air/Fuel COMM over a wide speed range for the IPU. This speed range extends from zero speed to $N_{100}$ speed (See, FIG. 5). The Air/Fuel COMM signal is provided as an input signal to air modulating control valve 48, either through a selector 163 directly, or via conventional signal conditioning devices (not shown). Similarly, the signal Air/Fuel COMM is fed to a scheduler 164 which provides the signal $W_F$ to the remainder of ECU 18 during startup via a summing junction 166 and selector 168.

Thus, during startup of IPU 12 in EPU mode the control loop from signal CIP to mass air flow through valves 47, 48 from storage bottle 16 and into the combustor 26 is closed by the aerodynamic response of the IPU 12 itself. That is, the scheduler 158 is a predictor of air flow required from storage source 16 to achieve a selected value for combustor inlet air pressure during startup acceleration of the IPU 12. This prediction is predicated upon a particular present value of signal CIP, and takes into consideration the rapid acceleration and changing air flow of IPU 12 during startup. The prediction values are based upon analytical and test data, and are expressed as a value of the signal Air/Fuel COMM provided by the scheduler 158 to selector 162. Fuel flow to combustor 26 is controlled open loop during this startup period by scheduler 164. The scheduler 164, like scheduler 158, is a predictor. The prediction conducted by scheduler 164 is one intended to control fuel flow to the combustor 26 based upon air flow rate to the combustor. The result is an air/fuel ratio for combustion which produces a selected temperature of combustion products flowing to turbine section 36. During startup of the IPU 12, the control of air/fuel ratio as set out above enables rapid acceleration of the IPU from stand still to full speed in about two seconds. As will be seen, this control scheme also economizes on use of stored air from bottle 16 during sustaining operation of the IPU 12 in EPU operating mode.

The control portion 148 also receives a signal N% indicative of the speed of shaft 42. The N% signal is compared with a reference value $N_{ref}$ at summing junction 170, and an error signal $N_{err}$ is provided to a selector 172. As soon as one hundred percent of design speed is achieved by the IPU 12, a speed sensor and signal generator 174, produces the $N_{100}$ signal in response to the signal N% achieving design speed value, or a predetermined value indicative of the IPU 12 having substantially achieved design speed (See, FIG. 5). Consequently, each of the several selectors in the control portion 148 upon receiving signal $N_{100}$ switches to their (1) condition. In the (1) condition, the selectors provide as their output the signal applied to their (1) terminal. This change in status of the various selectors of control portion 148 in response to the $N_{100}$ signal is indicative of the IPU 12 changing from startup to sustaining EPU mode operation, and is easily discerned in the traces of FIG. 5. Consequently, the true value of signal CIP is applied at junction 150 along with $P_2ref$ which is now lowered to the biased and limited selected value at terminal (1) of selector 156. The $N_{100}$ signal is also used within ECU 18 as a load enable signal so that the IPU 12 accelerates to design operating speed quickly without load, and full EPU load may be applied upon $N_{100}$ being generated. The $P_2err$ signal which is output from junction 150 is operated on by scheduler 160, and is provided as signal Air/Fuel COMM during sustaining operation of IPU 12 in EPU mode. The scheduler 160 is constructed to control the IPU 12 in a narrow speed range around its design speed as the applied load and aircraft altitude variations introduce perturbations to this speed. As with the scheduler 158, the scheduler 160 provides a prediction of air flow required near design speed to sustain the needed air pressure in combustor 26. As before, scheduler 164 provides a part of the signal $W_F$ to control air/fuel ratio in the combustor 26, and the temperature of combustion products flowing from combustor 26 to turbine section 36.

Additionally switching of selector 172 to its (1) condition allows passage of the signal $N_{err}$ to each one of a proportional controller 176, a gain correction scheduler 178, and an integral controller 180. The gain correction scheduler 178 is constructed to provide a high gain output signal in response to transient change of signal $N_{err}$, and a signal with little or no gain near conditions of steady state operation of IPU 12.

The output signal from scheduler 178 is combined at junction 182 with the output of proportional controller 176. Similarly, the output signal from integral controller 180 is combined at junction 184 with the composite signal from junction 182. The resulting signal designated RPM/Air is applied as a negative input to junction 150 via a pass-positive signal conditioner 186. The pass-positive signal conditioner allows application to junction 150 only of those signals which would decrease $P_2ERR$. This signal RPM/Air, limited as it is to values which will decrease air flow from tank 16 not only economizes on air flow usage from the storage tank during sustaining operation in EPU mode, but also provides a quick acting turn down or decrease of air flow immediately following $N_{100}$ during acceleration of IPU 12. This quick reaction turn down of air flow to combustor 26 serves to minimize speed overshoot beyond the set design speed (See, FIG. 5). This speed overshoot is somewhat damped by the application of EPU load upon occurrence of $N_{100}$. However, the speed overshoot would be greater than desired, and would take longer to settle out, without the quick reduction of air flow effected by the RPM/Air signal acting on the air control part of control portion 148. This signal also establishes an additional closure loop within the control portion 148 as will be additionally explained below.

Switching of selector 172 to its (1) condition also allows application of signal $N_{err}$ to proportional controller 188, and integral controller 190. Each of these controllers provides an output signal which is combined at summing junction 192, and is provided to junction 166 via a selector 194 as a signal designated $N_{correct}$. The $N_{correct}$ signal along with signal Air/Fuel COMM from scheduler 164 produces signal $W_F$ in sustaining EPU mode of operation of the IPU 12. Thus, in contrast to the startup phase of EPU operation, the sustaining phase uses a double closed loop control. That is, the control loop from signal CIP to mass air flow through valves 47, 48 is closed by aerodynamic response of IPU 12 as in the startup phase. Also, the control loop from signal N% through signal $W_F$ and the mass fuel flow to combustor 26 is closed by the speed response of the IPU 12 in view of the applied load. And finally, the control loops are cross coupled by selected values of the signal RPM/Air, both to economize on the useage of air from storage bottle 16, and to minimize speed overshoot upon design speed being attained during acceleration of IPU 12 at completion of startup acceleration.

APU START AND OPERATION

The starting and operation of IPU 12 in APU mode may be carried out generally the same as starting a conventional APU with an air turbine starter. This starting sequence additionally requires the application of a (0) status command to the selector 163 so that valve 47 is not opened. Also, a (0) status command to selector 168 ensures that the signal $W_F$ is derived from a summing junction 196 as is more fully explained below. Subsequently, under control of the ECU 18, the valve 54 is opened to allow flow of pressurized air from storage bottle 16 to air turbine starter 56. The starter 56 accelerates the IPU 12 toward its operating speed. Generally at about 10% operating speed, fuel flow to the combustor 26 is initiated along with operation of conventional spark igniters (not shown) to light off combustion in the combustor 26. Thereafter, torque from the air turbine starter 56 and energy from the combustion gases acting on the turbine 36 continue acceleration of the IPU 12 toward its design speed. At a selected speed, less than design speed, valve 54 is closed to discontinue torque delivery from the air turbine starter 56. Thereafter, the IPU 12 accelerates under its own power to its design operating speed.

The control portion 148 receives the signal N%, as discussed above. This N% signal along with a signal $T_1$ indicative of ambient temperature at inlet 64 is applied to a scheduler 198 entitled Accel. The Accel scheduler 198 provides a modifying influence to fuel flow rate during acceleration of the IPU 12 dependent upon the ambient temperature of air ingested by the IPU and its operating speed. An additional modification to fuel flow rate is effected by a scheduler 200 which receives a signal $P_1$, indicative of ambient air pressure at inlet 64.

In order to provide fine control of fuel delivery near lighting of combustion in combustor 26, a signal EGT indicative of exhaust gas temperature is applied to a scheduler 202 entitled Lite-Off. The EGT signal is also applied to a summing junction 204 along with a negative signal value from a scheduler 206. The scheduler 206 receives as its input the N% signal and provides a trimming signal to the junction 204. The signal from junction 204 is applied to a network of limiters and value comparators generally referenced with the numeral 208, and whose output is provided through a selector 210 as a negative value to junction 196. The signal provided to junction 196 from selector 210 is a trimming signal to control startup over temperature and temperature transient rates within IPU 12, particularly within the turbine 36.

Further to the above, the control portion 148 includes a speed control channel generally referenced with the numeral 212, and which is enabled by a selector 214 upon $N_{100}$, and receiving the signal $N_{err}$. The speed control channel 212 includes a proportional controller 216 and integral controller 218. Bias inputs controlled by a selector 220 ensure control signals from the schedulers discussed above are selected by selectors 222 and 224 prior to $N_{100}$. That is, the output from speed channel 212 is blocked out and of no effect until $N_{100}$ is achieved. Upon $N_{100}$ being achieved, the IPU 12 transitions to sustaining operation, much as discussed above with respect to EPU operation. That is, all of the selectors are set to their (1) condition, so that the signal from speed control channel 212 provides the signal $W_F$ in response to signal N%.

Those skilled in the pertinent art will recognize that the IPU 12 may be started for APU operation by effecting a startup in EPU mode, achieving sustaining EPU operation, and transitioning to APU operation as described below. This method of starting the IPU 12 for APU operation eliminates the necessity for control valve 54 and air turbine starter 56. Also, the gear box 44 may be smaller, lighter, and less expensive because the gear train associated with starter 56 is no longer required.

TRANSITION FROM EPU TO APU MODE

In view of the above, it will be appreciated that after the IPU 12 has been started in EPU mode and has substantially achieved its design operating speed (indicated by signal $N_{100}$), the IPU may be transitioned to APU mode upon the aircraft descending to an altitude low enough to facilitate this transition. In other words, the aircraft altitude must be low enough so that at design speed for the engine 20, the compressor 22 is able to provide the mass air flow and pressure required at combustor 26 to sustain the load on the IPU without air delivery from storage bottle 16.

This transition may be effected in response to a manual input, or in response to an automatic input, for example, an input based on data from the aircraft air data computer. In either case, the transition of IPU 12 from EPU to APU mode is effected within control portion 148 by applying a (0) status input to selectors 163 and 168. It will be seen viewing FIG. 4 that the (0) status of selector 163 simply removes the opening signal Air/Fuel COMM from air control valves 47 and 48. The valve 47 is a quick acting normally closed biposition valve which is driven fully open by the input signal thereto. The valve 48 is a slower responding normally open modulating valve which closes partially in response to the Air/Fuel COMM signal to control air flow rate from bottle 16 to the combustor 26. Consequently, valve 47 simply closes to cut off the supply of pressurized air from storage bottle 16 to IPU 12 when a (0) command is applied to selection 163. Similarly, the (0) status of selector 168 results in the signal from scheduler 164 being removed from the output of the selector and being replaced by the signal from junction 196. That is, signal $W_F$ is derived from junction 196 when a (0) command is applied to selector 168.

Figure 6:
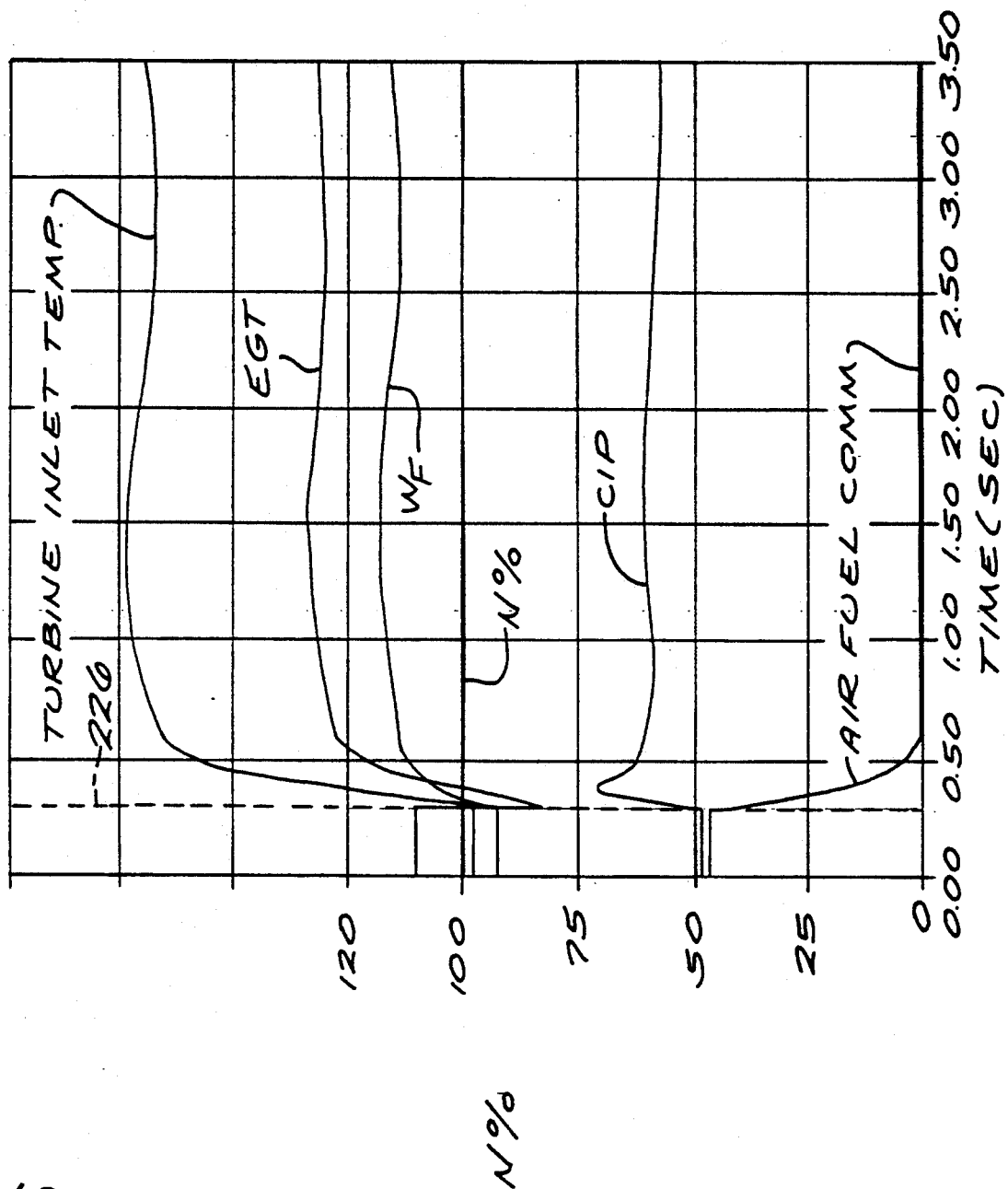

Viewing FIG. 6, the dashed line 226 represents the time of the (0) status commands being applied to selectors 163 and 168, recalling the description of FIG. 4. The signal Air/Fuel COMM drops to zero immediately so that the labeled trace line in fact represents the closing curve of valve 47. It will be seen that this closing approximates a step function, and has a duration of about one-fourth second. The significance of this sudden cut off of air flow from storage bottle 16 to the IPU is that the aerodynamic declutching of compressor 22 resulting from the slight back flow therethrough also ends. In the case where inlet blocking vanes 65 are moved and latched by an actuator, the (O) input command to selectors 163 and 168 is also used to command opening of the vanes 65. Thus, the compressor 22 begins ingesting ambient air and the air flow in the compressor reverts to its normal direction. The check valves 86 are opened by this flow from compressor 22, and the combustor 26 begins receiving all of its air flow from the compressor 22. The increase in pressure indicated in trace CIP subsequent to line 226 indicates that the compressor 22 was capable of supplying the necessary mass flow and pressure ratio at the altitude of transition, and had been prevented from doing so by the aerodynamic declutching in effect prior to the transition to APU mode. It will be noted that there is virtually no drop of power output of the IPU 12. That is, the N% trace does not significantly deviate from its 100% value during the transition from EPU to APU mode.

FIG. 6 also includes 3 additional traces designated $W_F$, EGT, and turbine inlet temperature: and respectively representing fuel flow rate, exhaust gas temperature (from which signal EGT is derived) and temperature of combustion products flowing from combustor 26 to turbine section 36. It is seen that each of these values increases upon transition from EPU to APU mode indicating the greater horsepower required of turbine 36 to drive compressor 22 once declutching of the latter is ended. As was mentioned before by way of example only, the horsepower absorption of compressor 22 changes from about six horsepower declutched to about 158 horsepower at design speed and 20K feet altitude on a $-12°$ F. day with shaft power output of the IPU 12 at a substantially constant 200 horsepower in both EPU mode prior to transition, and in APU mode after transition.

While the present invention has been depicted, described and defined by reference to one particularly preferred embodiment of the invention, such reference does not imply a limitation upon the invention, and no such limitation is to be inferred. The invention is intended to be limited only by the spirit and scope of the appended claims which provide additional definition of the invention.

What is claimed is:

1. A method of operating a combustor for a turbine engine, said method comprising the steps of:
   receiving into said combustor a first flow of pressurized air from a first source;
   mixing fuel with said first flow of pressurized air to provide an air/fuel mixture; combusting said air/fuel mixture to provide a flow of pressurized high temperature combustion products; and
   receiving into said combustor a second flow of pressurized air from a second source; while simultaneously discontinuing said first flow of pressurized air and maintaining said flow of combustion products.

2. The method of claim 1 further including the steps of flowing said air from said first source into said combustor along a flow path in a first direction: and flowing said air from said second source along said flow path in a direction opposite said first direction.

3. The method of claim 1 including the steps of using a fuel injection nozzle to mix said fuel with said first air flow, and using the same said fuel injection nozzle to also mix said fuel with said second air flow.

* * * * *